United States Patent
Migliore

(10) Patent No.: US 7,930,823 B2
(45) Date of Patent: Apr. 26, 2011

(54) CELL FOR AUTOMATED ASSEMBLING OPERATIONS AND ASSEMBLING LINE INCLUDING A PLURALITY OF THESE CELLS

(75) Inventor: Luigi Migliore, Grugliasco (IT)

(73) Assignee: Comau S.p.A., Grugliasco Torino (IT)

( * ) Notice: Subject to any disclaimer, the term of this patent is extended or adjusted under 35 U.S.C. 154(b) by 949 days.

(21) Appl. No.: 11/780,326

(22) Filed: Jul. 19, 2007

(65) Prior Publication Data

US 2008/0016669 A1    Jan. 24, 2008

(30) Foreign Application Priority Data

Jul. 19, 2006 (EP) .................................... 06425499

(51) Int. Cl.
*B21K 3/00* (2006.01)
*B23P 19/00* (2006.01)

(52) U.S. Cl. ........... 29/888.01; 29/429; 29/430; 29/467; 29/468; 29/559; 29/799; 29/822; 29/824; 29/281.1; 29/281.4; 29/281.5

(58) Field of Classification Search ............. 29/429, 29/430, 464, 466, 467, 468, 559, 783, 791, 29/799, 822, 824, 281.1, 281.4, 281.5, 281.6, 29/897.2, 888.01
See application file for complete search history.

(56) References Cited

U.S. PATENT DOCUMENTS

| 4,879,795 | A | 11/1989 | Nakamura et al. | |
|---|---|---|---|---|
| 5,993,364 | A | 11/1999 | Matsuura et al. | |
| 6,546,616 | B2 * | 4/2003 | Radowick | 29/720 |
| 7,134,178 | B2 * | 11/2006 | Xiong | 29/467 |

FOREIGN PATENT DOCUMENTS

| EP | 0496995 | 12/1991 |
|---|---|---|
| EP | 0639807 | 7/1994 |
| EP | 07032223 | 2/1995 |
| EP | 0708229 | 4/1996 |
| FR | 2557070 | 12/1984 |
| FR | 2723019 | 7/1994 |
| JP | 01097535 | 4/1989 |
| JP | 2000271825 | 3/2000 |
| JP | 2000126943 | 5/2000 |

OTHER PUBLICATIONS

International Search Report for EP06425500 dated Jan. 18, 2007.
International Search Report for EP06425499 dated Jan. 18, 2007.

* cited by examiner

*Primary Examiner* — Jermie E Cozart
(74) *Attorney, Agent, or Firm* — Young Basile

(57) ABSTRACT

A cell for automated assembly operations, in particular for the assembly of parts of multicylinder internal-combustion engines, has manipulator members that are designed for simultaneous assembly of a plurality of elements on a work piece and that are adjustable for varying the distance between the positions of said elements.

15 Claims, 12 Drawing Sheets

CELL FOR AUTOMATED ASSEMBLING OPERATIONS AND ASSEMBLING LINE INCLUDING A PLURALITY OF THESE CELLS

CROSS REFERENCE TO RELATED APPLICATIONS

The present application claims priority of European patent application EP06425499, filed Jul. 19, 2006, the full disclosure of which is incorporated herein by reference.

FIELD OF THE INVENTION

The present invention relates to cells for performing automated assembly operations, such as the assembly of engines or transmission units for motor vehicles, and in particular for the assembly of multi-cylinder internal combustion engines.

BACKGROUND AND SUMMARY OF THE INVENTION

An assembly cell for performing automated assembly operations is provided. The assembly cell includes a fixed supporting structure defining an assembly station, a conveying device for feeding a work piece, such as a cylinder head, to the assembly station for the purpose of assembling thereon one or more accessory elements, and for sending the work piece out of the assembly station once the assembly operations are completed. The assembly cell also includes a means for referencing in position and supporting the work piece in the assembly station during execution of the assembly operations and a manipulator means moveably mounted to the supporting structure for execution of the assembly operations on the work piece present within the assembly station. The manipulator means are designed for simultaneous assembly of a plurality of elements on the work piece and are adjustable for varying the distance between the positions of the elements.

The assembly cell can be dedicated to the assembly of various parts, such as those of multi-cylinder internal combustion engines, wherein the manipulator means are designed for simultaneous assembly of elements associated to the different cylinders of the engine and are adjustable so as to be able to operate on components of engines having different values of the distance between the centres of the cylinders.

The assembly cell is capable of operating on a series of different types of work pieces, such as differently configured engines. This enables both adaptation of the cell for carrying out a given assembly operation, such as, for example, assembly of the engine valves on a new type of engine whenever it is decided to pass from the production of an old type of engine to the production of the new type, and adaptation of one and the same type of cell for automated assembly operations to provide different stations in an automated assembly line.

The manipulator means may comprise a plurality of gripping members supported by a structure that can be displaced in a controlled way according to a vertical axis and a horizontal axis orthogonal to the longitudinal direction of a line for conveying the pieces through the assembly cell. The gripping members are carried by the supporting structure so that the distance between the gripping members can be adjusted.

The means for position referencing and support of the work piece in the assembly station may include a device having means that enable orientation of the work piece via an oscillation about a horizontal axis parallel to the longitudinal direction of the line for conveying the work pieces through the assembly cell, as well as displacement of the work piece in the aforesaid longitudinal direction. Due to the combined movement of the means for supporting the work piece and the means for supporting the members for gripping the parts to be assembled, it is possible to pre-arrange the automated cell for carrying out assembly on work pieces, such as engines, having different geometries, for example, different values of the distance between centres of the cylinders, and presenting different positioning and orientation of the parts to be assembled on the work piece. For this purpose, the work piece, such as for example a cylinder head, is fed to the assembly station, being kept aligned in the longitudinal direction of conveyance, so that a variation of the distance between the gripping members can be used for adapting the cell to operating on engines having different distances between centres of the cylinders.

The principle described above with reference to the members for gripping parts to be assembled on the engine can also be applied, for example, where it is necessary to engage the piece that is in the assembly station at predetermined points, for example, by means of retention elements designed to prevent elements already provisionally assembled on the work piece from becoming misaligned before they are definitively fixed.

BRIEF DESCRIPTION OF THE DRAWINGS

The description herein makes reference to the accompanying drawings wherein like reference characters refer to like parts throughout the several views, and wherein.

DETAILED DESCRIPTION

Figure 1:
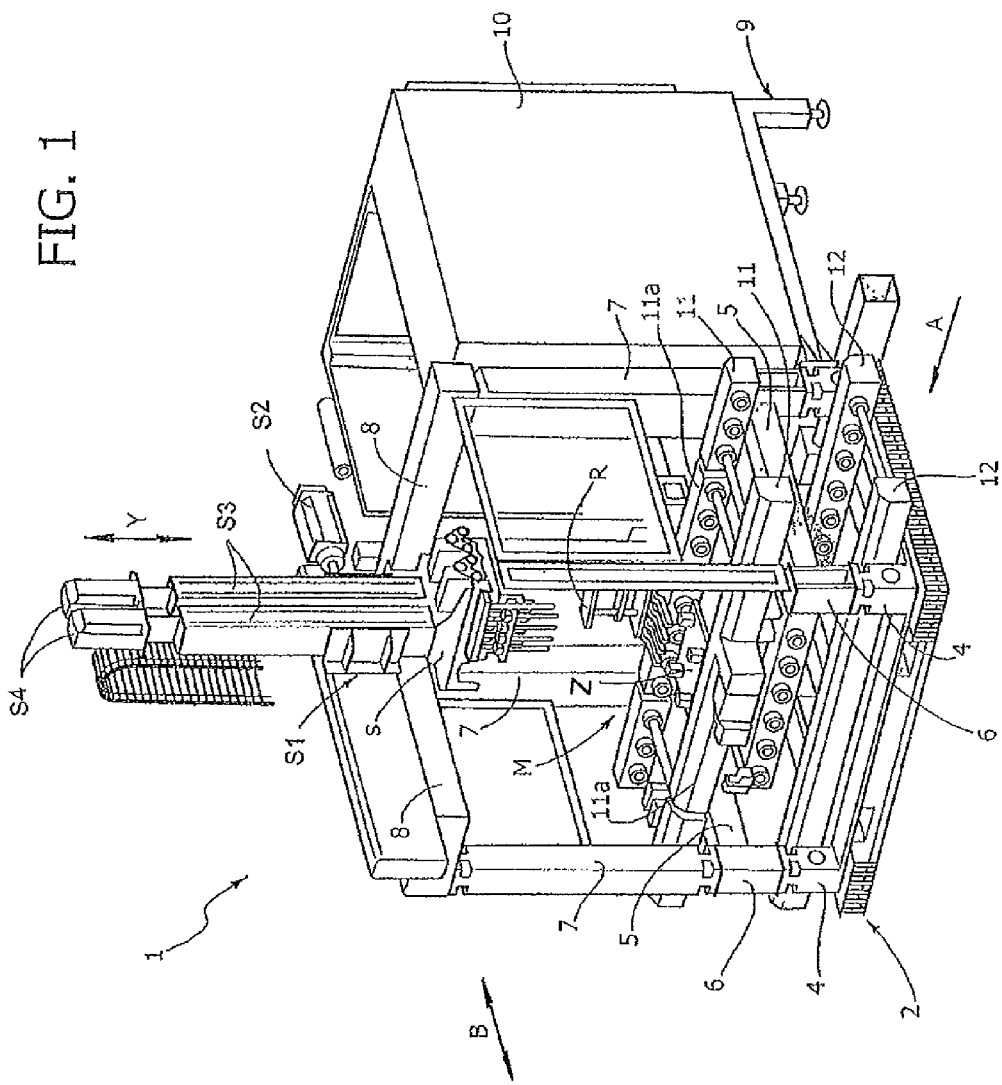
FIG. 1 is a perspective view showing an embodiment of the assembly cell for performing automated assembly operations disclosed herein.

With reference to FIG. 1, a cell 1 for automated assembly of parts on a work piece, such as an internal-combustion engine, is shown. Cell 1 can be used for automated installation, such as on a cylinder head of an internal-combustion engine, of parts, such as engine valves, cups associated with the engine valves, springs associated with the engine valves, cotters associated with the engine valves, and tappets for actuation of the engine valves. The same assembly cell can be used for carrying out one or more of the aforesaid operations. This means, on the one hand, that a given cell can be adapted for operating in a different way over time and, on the other hand, that an entire assembly line for automated assembly can be provided, in which the different operations of the assembly cycle, for example, assembly of a cylinder head, are performed using a plurality of assembly cells of the type described herein, each of which can be adapted as required to the specific needs of the assembly cycle.

Figure 2:
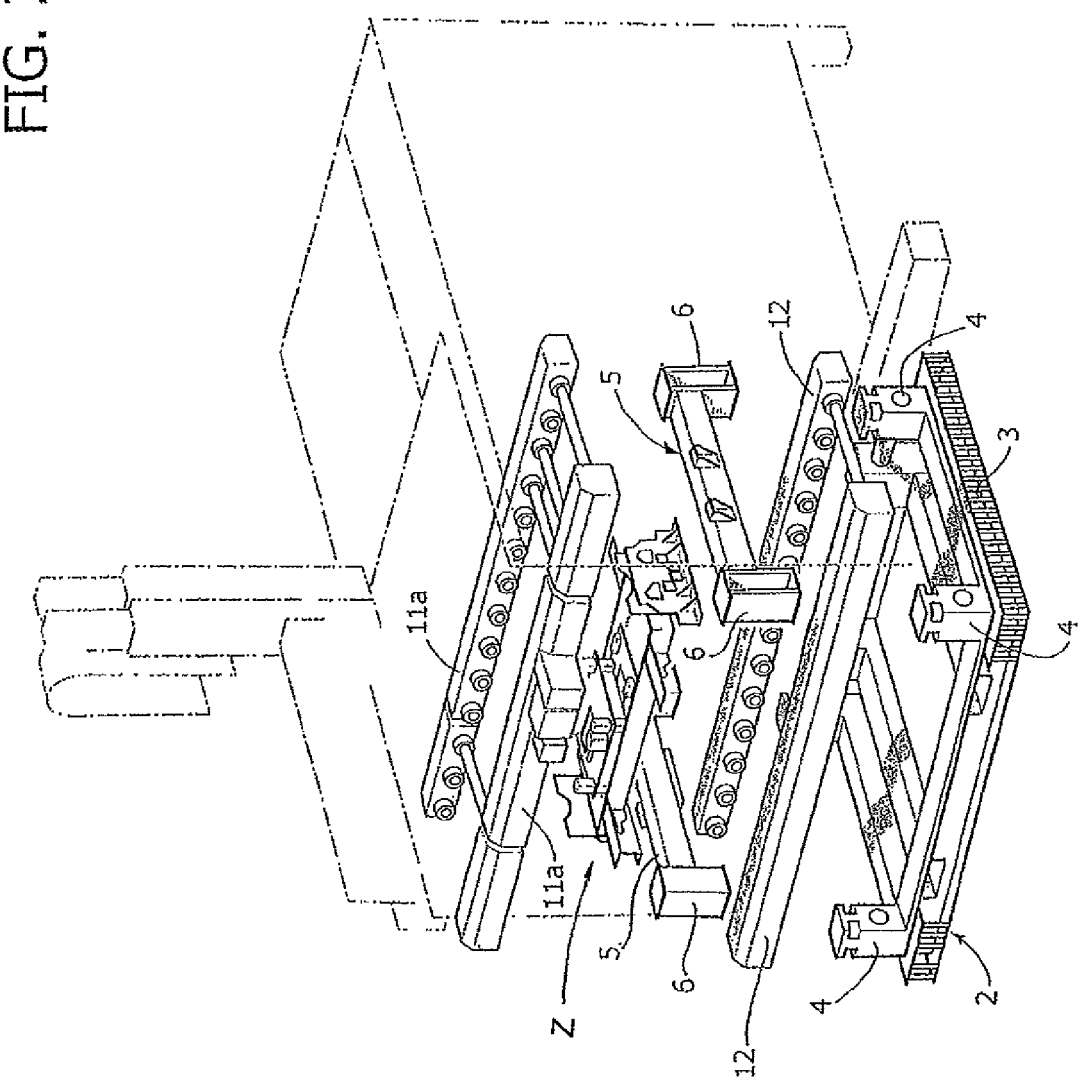
FIG. 2 is an exploded perspective view of certain components of the assembly cell shown in FIG. 1.
Figure 3:
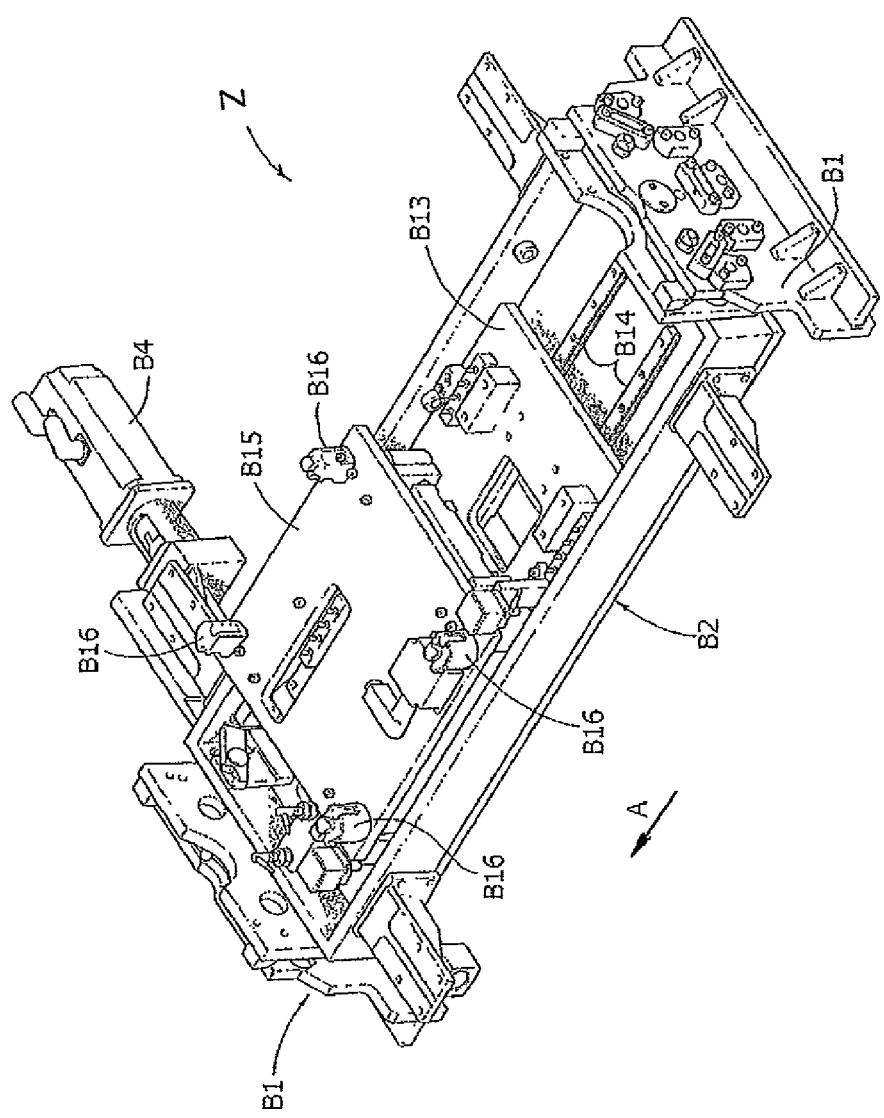
FIG. 3 is a perspective view of a base fixture employed with the assembly cell.
Figure 4:
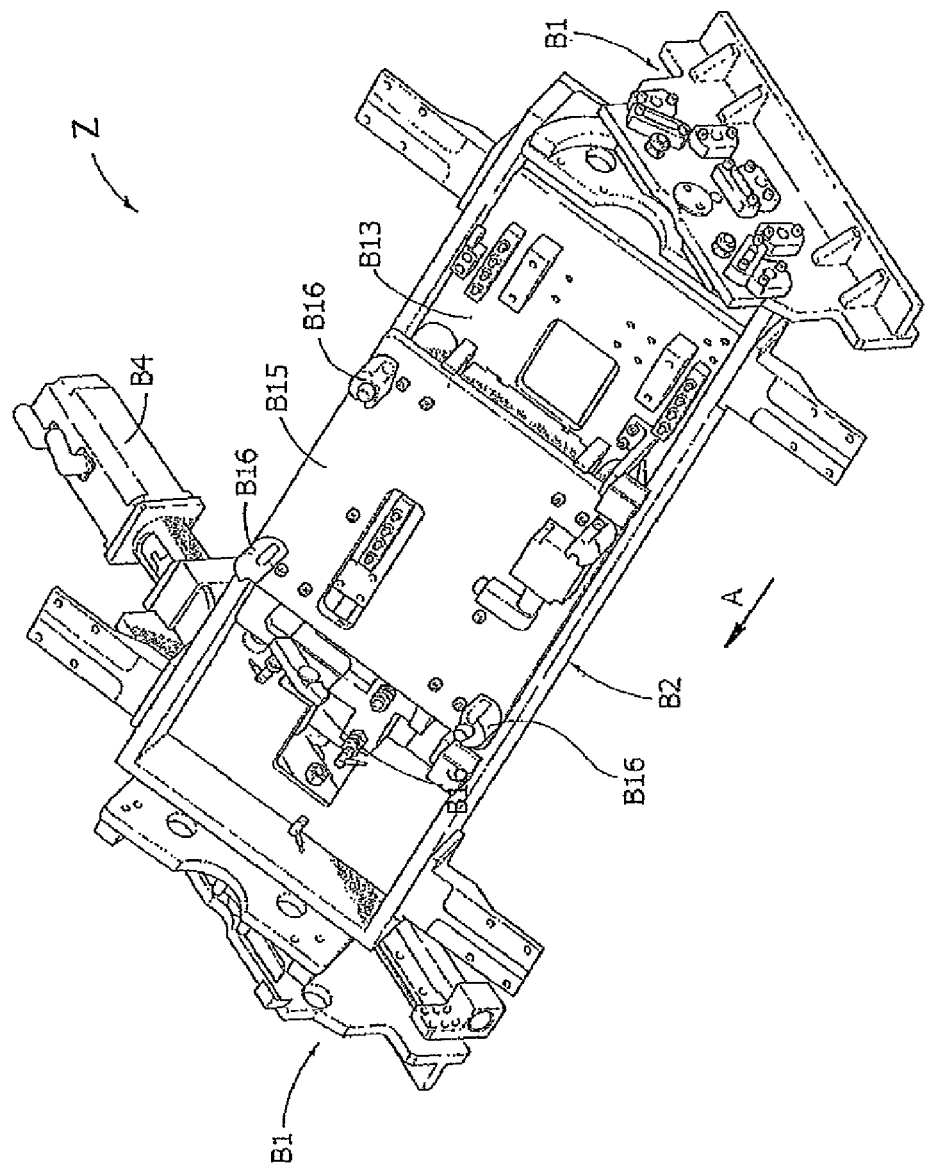
FIG. 4 is a perspective view of the base fixture shown in an alternate operating condition.
Figure 5:
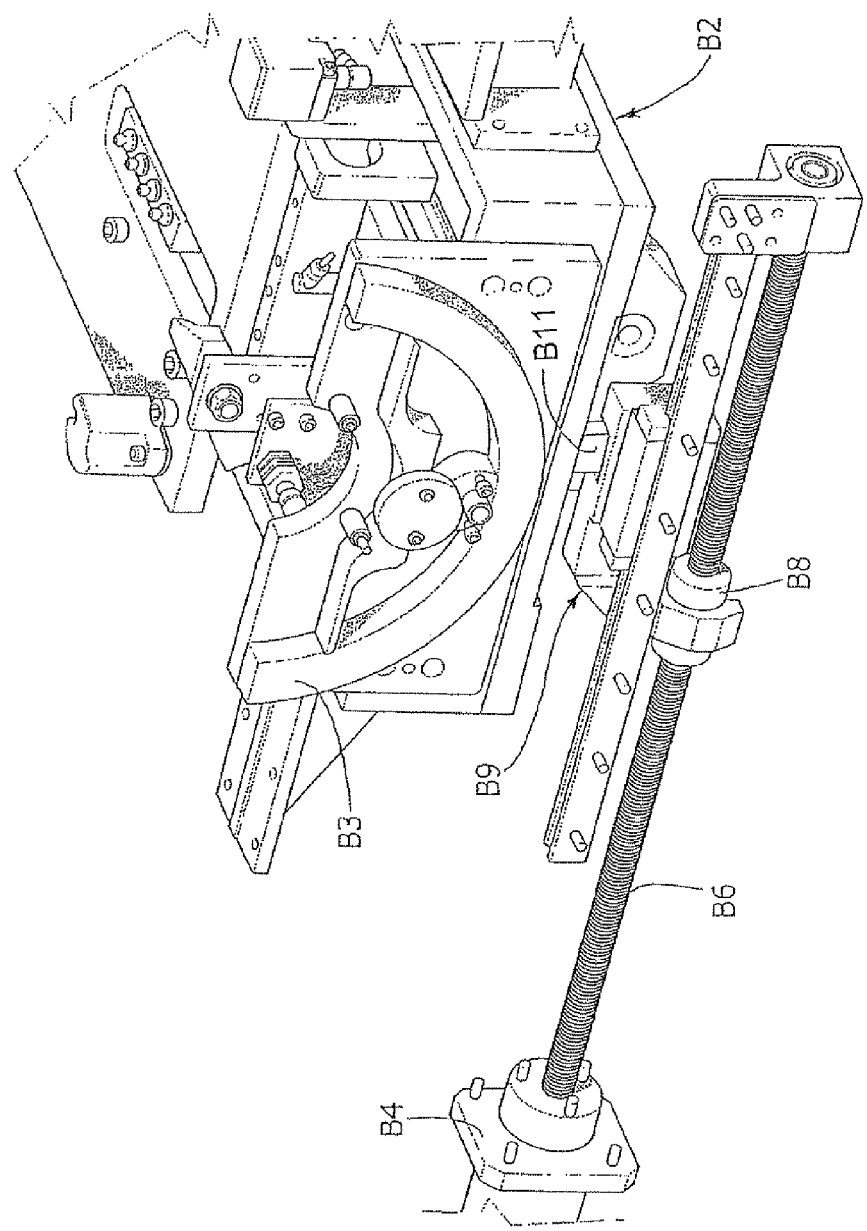
FIG. 5 is a fragmentary end perspective view of the base fixture with its end plate removed.
Figure 6:
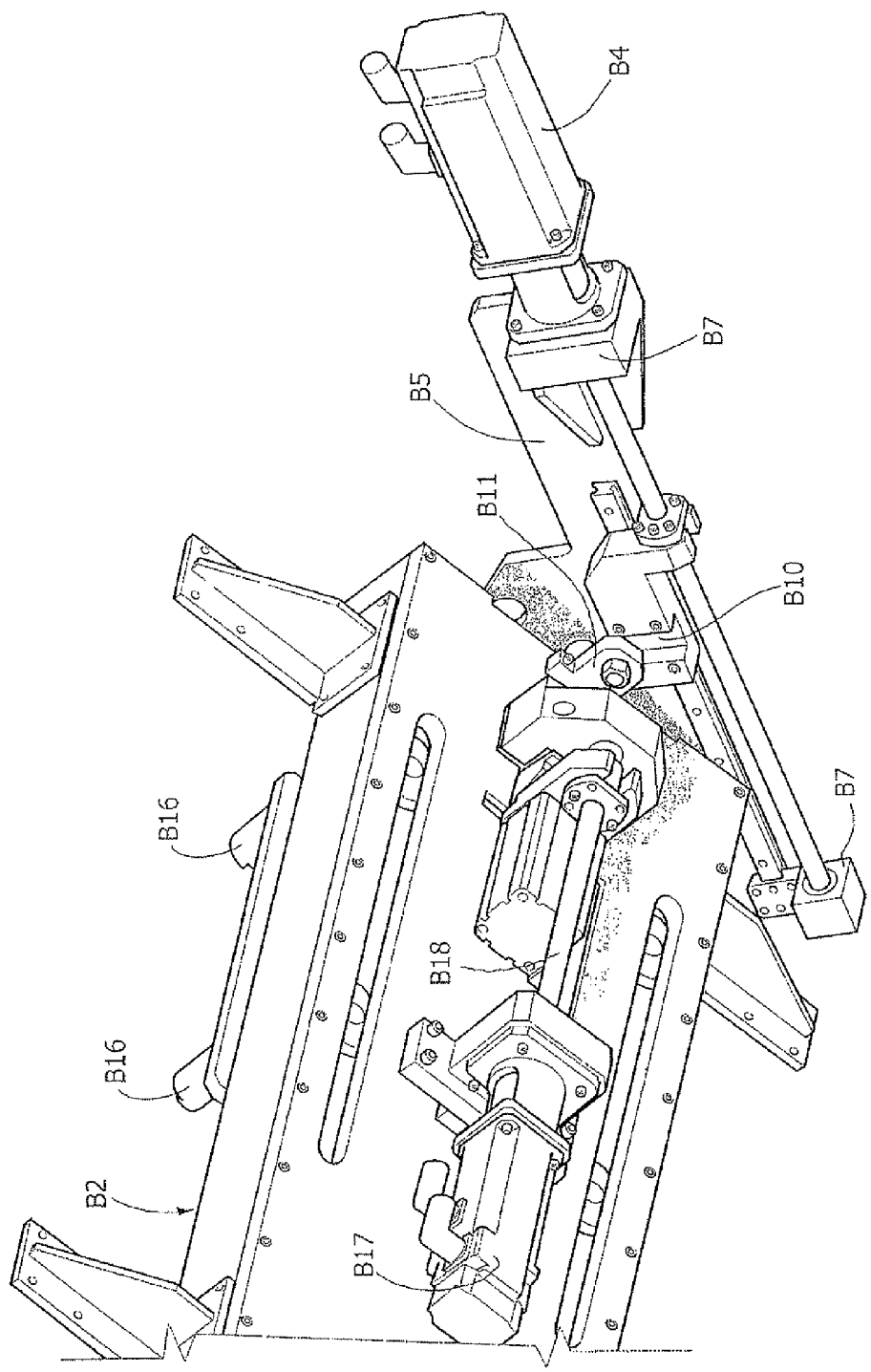
FIG. 6 is fragmentary bottom perspective view of the base fixture.

With reference also to FIG. 2, cell 1 comprises a base structure 2 that includes a bed plate 3 for resting on a floor. Four supporting blocks 4 are provided at the vertices of bed plate 3. Supporting blocks 4 function in pairs as supports for a cross member 5, which are welded at the ends to two blocks 6. Each of the blocks 6 rest on a respective block 4.

Rising above blocks 6 are respective columns 7, which are connected at the top by cross members 8. Anchored at the rear to the framework thus defined is a supporting structure 9 for a cabinet 10, which contains the electronic control equipment and various auxiliary services associated with cell 1.

Cross members 5 support horizontal beams 11 of a top branch of a conveying device having motor-driven rollers for the movement of pallets (not shown) that are to carry the work pieces to be machined, for example, the cylinder heads, in succession within assembly cell 1. In FIG. 1, arrow A indicates the direction of movement of the conveying line, which is orthogonal to the direction of the cross members 5. The conveying line carries in succession the pallets, with the work pieces, for example cylinder heads, arranged thereon, to an assembly station set within cell 1, designated as a whole by reference character M. The same conveying device is operable for conveying a work piece, for example, a cylinder head, after completion of the cycle of operations in cell 1, out of the cell, toward one or more subsequent stations of the assembly line. The conveying device may have a top branch for movement of the pallets carrying the cylinder heads, and a bottom branch, defined by longitudinal supporting beams 12, for return of the empty pallets towards an upstream end of the conveying device. Each of the pallets that are movable along the top branch of the conveying device may receive a work piece, for example, a cylinder head, at the upstream end of the conveying device, and the cylinder head carried thereon can be unloaded when it reaches an end of the conveying device, after which the same pallet is brought back to the upstream end of the conveying device, at which point the pallet can receive a new cylinder head, which together can be transported along the bottom branch of the conveying device in the direction opposite to the direction of movement along the top branch. As may be seen in FIG. 1, the longitudinal supporting beams 12 of the bottom branch of the conveyor can rest directly on base plate 2. Both the top branch and the bottom branch may have motor-driven rollers, carried by the respective longitudinal beams 11, 12 in order to convey by friction a pallet resting thereon.

When a pallet supporting a work piece, such as a cylinder head, that is to undergo the cycle of assembly operations within assembly cell 1 reaches assembly station M, a base fixture B, provided in assembly station M, elevates the work piece, raising it from its resting position on the motor-driven rollers of the conveying device, and orients the work piece in a desired position and keeps it clamped during execution of the assembly operations.

With reference also to FIGS. 3-6, base fixture Z may include two end supports B1 substantially shaped like vertical plates, which are arranged orthogonal to the longitudinal direction A and are provided with base flanges for fastening them to the fixed supporting structure of the cell. The two plates B1 function as supports for the oscillating mounting of a box-like structure B2 about a longitudinal axis. Said mounting is obtained by providing, at each end of the structure B2, a ribbing shaped like an arc of a circle B3. Rib B3 is guided between rollers carried by the ends of box B2, the rollers being configured to engage the inner and outer sides of ribbing B3. In this way, the box-like structure B2 can oscillate with respect to end plates B1 about an axis parallel to the longitudinal direction A. Said movement of oscillation can be controlled by an electric motor B4, the structure of which is supported by an appendage B5 of one of the end plates B13. Motor B4 includes an output shaft that governs a screw B6. The output shaft is supported in a rotating way by supports B7, carried by the aforesaid plate appendage B5, and is axially fixed. The output shaft engages within a lead nut B8 fixed to a moving element B9. The moving element B9 has a vertical groove B10, which is engaged by a roller carried by a lever B11 affixed to box-like structure B2, whereby activation of electric motor B4 enables control of the angular position of box-like structure B2 with respect to its axis of oscillation.

Box-like structure B2 supports a slide B13 guided on rails B14, which are mounted on the bottom of box-like structure B2, so that the slide B13 can slide in the longitudinal direction A. Slide B13 in turn supports a faceplate B15 that is vertically mobile with respect to slide B3 and is raisable to receive thereon a pallet that has arrived in the assembly station with a work piece, such as a cylinder head, carried thereon. Faceplate B15 is provided with elements 16 for locating the pallet in position thereon and for keeping the work piece the work piece clamped. When a pallet reaches the assembly station, it brings about automatically raising of faceplate B15 by means of a device provided for said purpose. Once the pallet is located and clamped on faceplate B15, its position can be varied in the direction A by causing a displacement of slide B13. The position of the slide B13 can be controlled by an electric motor B17 provided underneath box-like structure B2 and designed to govern a screw B18 engaged within a lead nut fixed to the slide B13.

Once a pallet has been located in position and clamped in the assembly station within assembly cell 1, the pallet can be oriented about a longitudinal axis, so that, for example, a cylinder head carried on the pallet can be oriented so as to present one surface thereof bearing the seats for the parts to be assembled, with the orientation being suitable for convenient execution of the assembly operations. Furthermore, the position of the work piece in the assembly station can be adjusted in the longitudinal direction A, according to the specific requirements of assembly and according to the characteristics of the work piece.

With further reference to FIG. 1, the elements to be assembled on the work piece present in the assembly station, such as for example, the engine valves to be assembled on a cylinder head that is in the assembly station, can be assembled using gripping tools carried by a supporting structure S that is movable above assembly station M both in a horizontal direction B orthogonal to the direction of the conveying line, and in a vertical direction Y. For this purpose, provided on top cross member 8, set orthogonal to the direction of the conveying line, is a slide S1 movable in the direction B. The movement and the position of slide S1 can be controlled by an electric motor S2, which is supported by the fixed frame of the cell and has an output shaft, which governs rotation of a screw that is engaged within a lead nut fixed to slide S1. In turn, slide S1 supports in a mobile way in the vertical direction Y two coupled slides S3, mounted at the bottom ends of which is the supporting structure S of the gripping tools. In the example illustrated, two supporting structures S are envisaged, fixed to the bottom ends of the two coupled structures S3, but obviously it would be possible to provide a single supporting structure S, fixed to a single vertical slide S3. Furthermore, each supporting structure S, instead of being fixed to the bottom end surface of the respective slide S3, may also be fixed to the vertical side surface of the slide S3, once again adjacent to the bottom ends thereof. Said choice depends upon the desired orientation of the set of gripping tools. The movement in the vertical direction Y of each slide S3 can be controlled by a respective electric motor S4 having a screw that engages an internal screw rigidly connected to the slide S1. The internal screw is then fixed with respect to the vertical direction, and the activation of electric motor S4 brings about displacement in the vertical direction of the displacement in the vertical direction of the respective screw with respect to the internal screw. In other words, when electric motor S4 is activated, the entire structure formed by the respective slide S3, with the screw associated thereto, and the structure of the respective electric motor S4 displaces vertically, while the lead nut is engaged by the screw, which remains vertically fixed and rigidly connected to slide S1.

Figure 7:
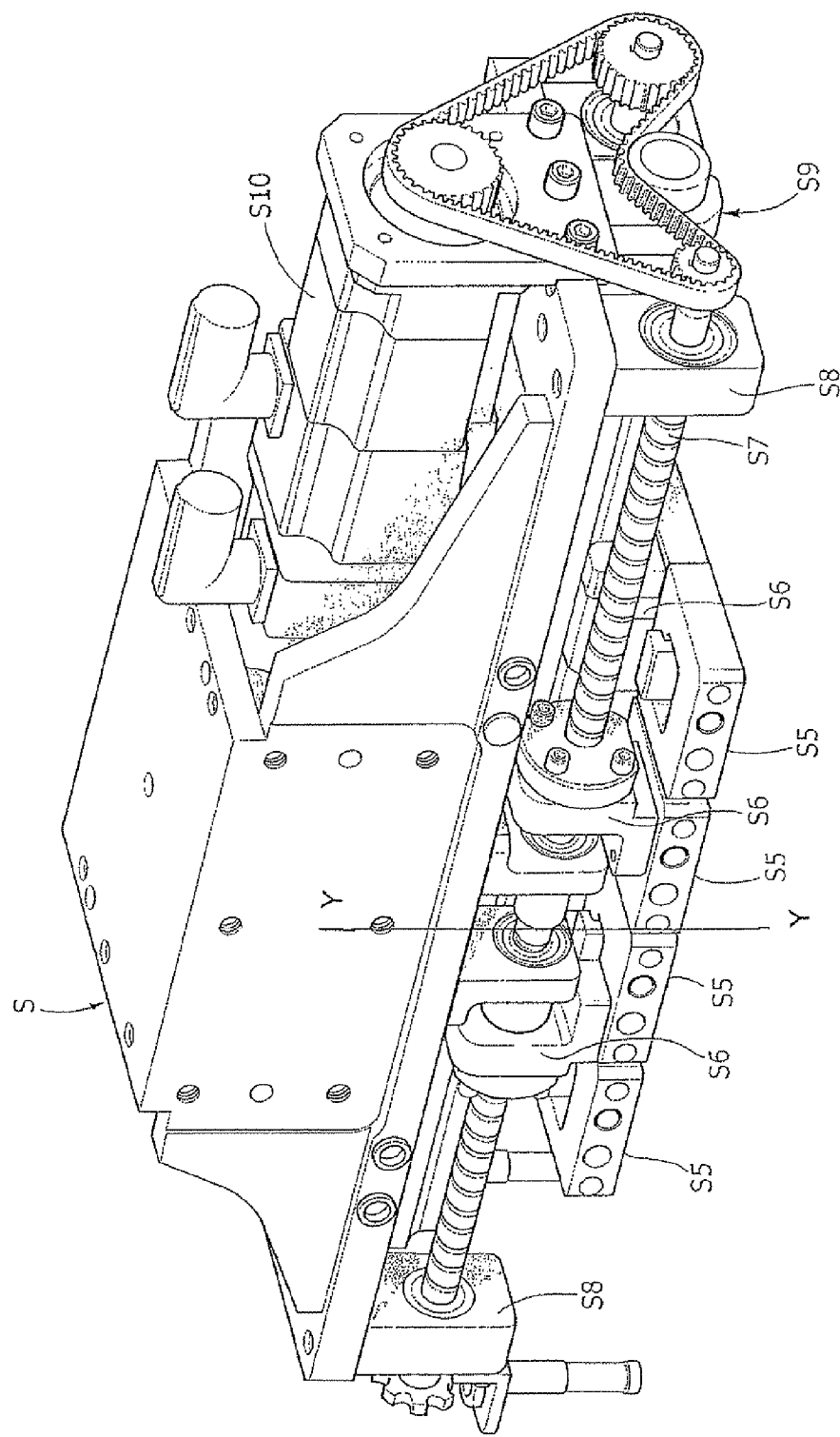
FIG. 7 is a perspective view of a structure for supporting various gripping tools employed with the assembly cell.
Figure 8:
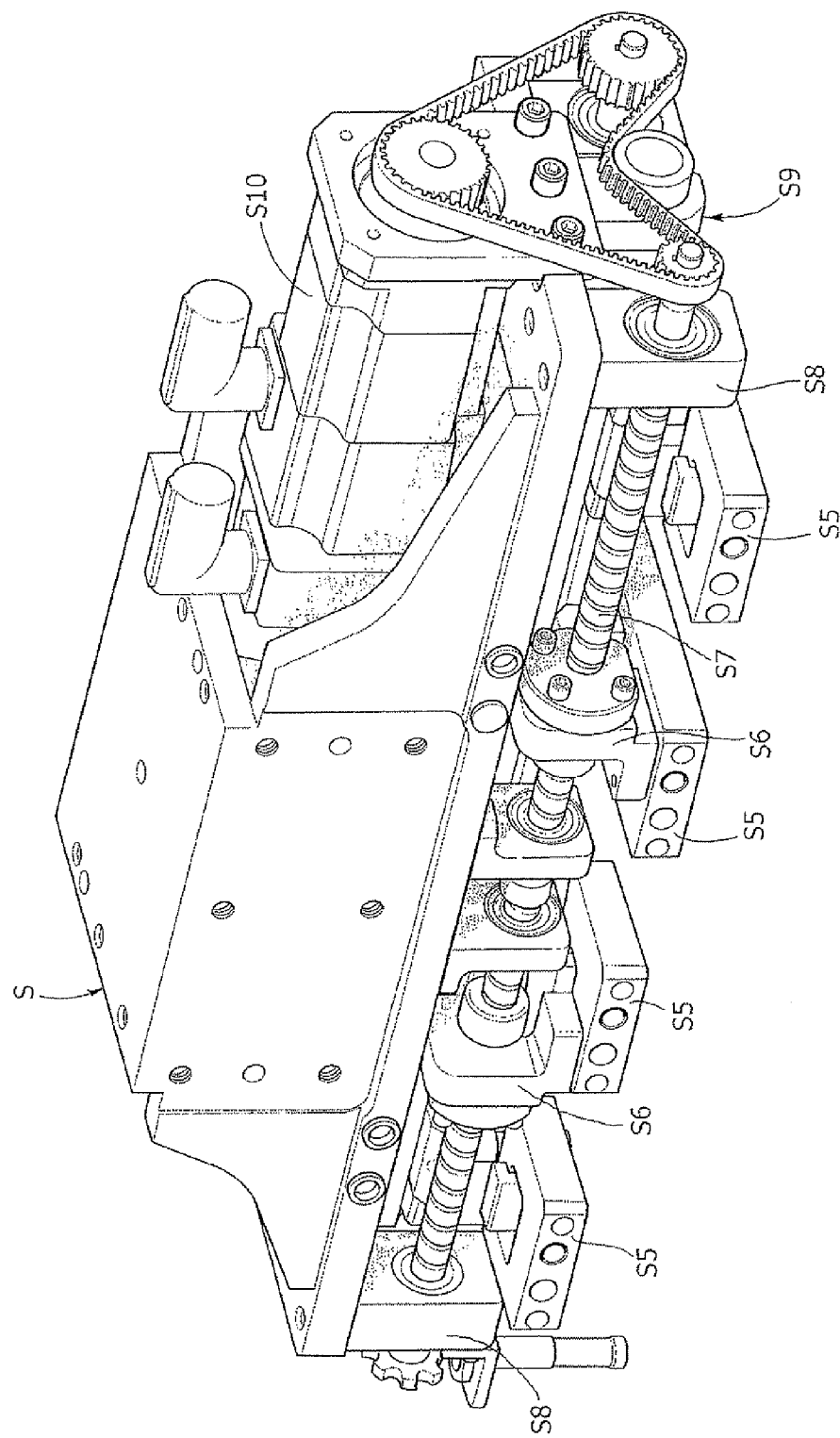
FIG. 8 is a perspective view of the supporting structure shown of FIG. 7 shown in an different operating condition.

FIGS. 7 and 8 illustrate the group of supporting structure S in two different operating conditions. The supporting structure S may be provided with four plates S5, each of which can carry a respective gripping tool. The gripping tools can be made in any known or to be developed manner. The gripping tools (which are four in the example illustrated) are carried by the four respective supporting plates S5 that can be positioned at different distances apart from one another, as may be seen from a comparison of FIG. 7 with FIG. 8. In other words, supporting plates S5, which are carried by the supporting structure S and are to support the gripping tools, are adjustable at different distances apart from one another so that the equipment illustrated is able to carry out simultaneous assembly, for example, of the valves associated with the various cylinders on a cylinder head, for different dimensions of the cylinder head, and in particular, for different values of the distance between centres of the cylinders.

Each of the supporting plates S5 is supported at each end by supports S6 bearing respective lead nuts. Said lead nuts are engaged by a screw S7, which is supported in a rotatable way by the supporting structure S by means of supports S8 and is driven in rotation by means of a toothed belt drive S9 by a motor unit S10. With respect to a vertical median plane, the trace of which is designated by Y-Y in FIG. 7, screw S7 is divided into two parts having threads with opposite directions. Furthermore each of the two halves of screw S7 is in turn made up of parts having different pitches, so that a rotation imparted on screw S7 starting from the condition illustrated in FIG. 7, in which the plates S5 for supporting the gripping members are brought up close to one another, brings about a progressive distancing of the four plates S5 from one another, with the outermost plates moving at a higher speed than the innermost plates so that at each instant the four plates S5 are located at the same distance apart from one another, up to a position of maximum distancing that corresponds to what is illustrated in FIG. 8.

The assembly cell disclosed herein is can be immediately adapted for operating on engines of different geometries or for carrying out different steps of the complete cycle of assembly of the cylinder head, according to the point of the assembly line in which the assembly cell is provided. It is consequently possible to pre-arrange an entire assembly line basically using cells that are substantially identical to one another and correspond to the teachings of the present invention.

Continuing to refer to FIG. 1, and also referring to FIGS. 9-12, the assembly cell for performing automated assembly operations may also include an assembly R provided with engagement members R1, which are to be pushed within the valve seats pre-arranged in the cylinder head to prevent the latter from falling out of the cylinder head until their assembly has been completed with the additional missing parts. Basically, then, the assembly R is able to carry a plurality of engagement members R1 to simultaneously engage corresponding parts of the cylinder head present within the assembly station. In manner similar to what has been seen for the structure S for supporting the gripping members, the engagement members R1 are also provided so that their mutual distance is adjustable.

Assembly R may include a fixed supporting structure R2, which can be fastened to the fixed frame of the assembly cell. The fixed supporting structure R1 defines guides R3, arranged horizontally and orthogonal to the longitudinal direction A, on which a bridge-like slide R4 is mounted. The movement of slide R4 on the fixed structure IC can be controlled by an electric motor R5, which sets in rotation a screw, which engages an internal screw, carried by the structure of the bridge-like slide R4.

Figure 9:
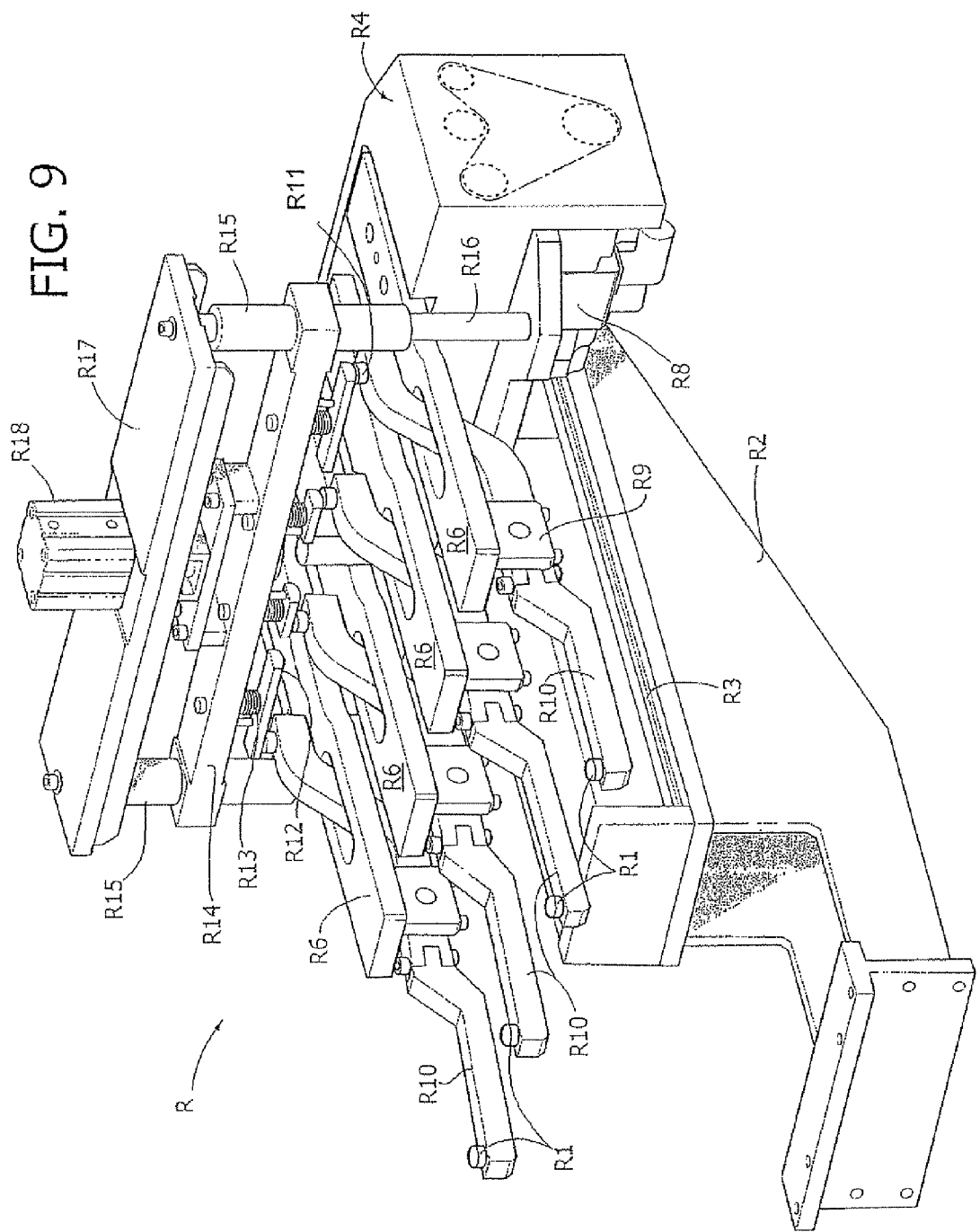
FIG. 9 is a perspective view of an assembly device employed with the assembly cell operable for performing various assembly operations.
Figure 10:
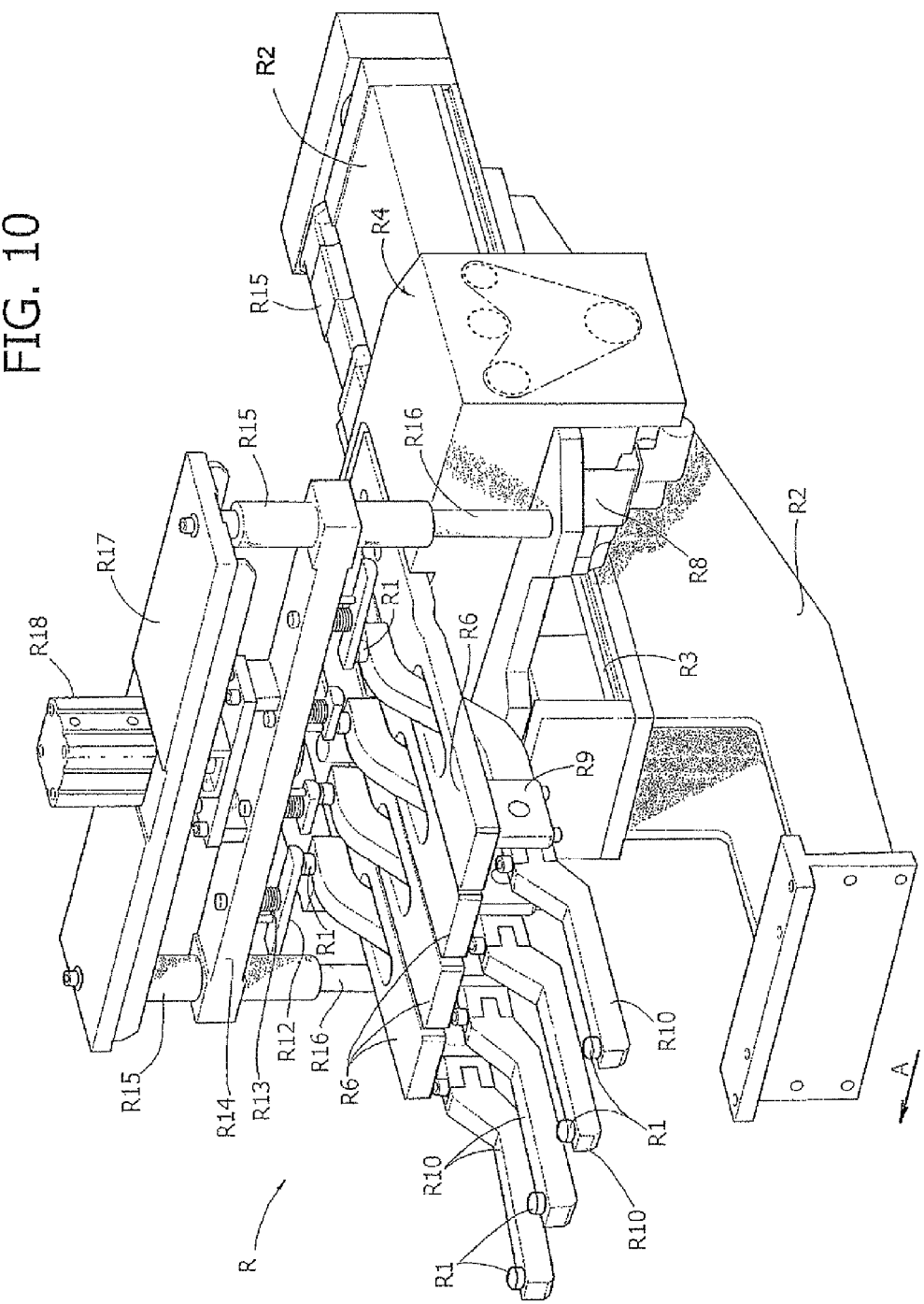
FIG. 10 is a perspective view of the assembly device shown in a different operating condition.

The bridge-like slide R4 supports four horizontal elongated and parallel plates R6 in such a way as to enable a regulation of the distances between said plates. For this purpose, each of the plates is connected to a support including an internal screw that engages a transverse screw R7, which can be controlled by means of a belt driven by a corresponding motor R8. Screw R7 is similar to the screw S7 described with reference to FIGS. 7 and 8. It is divided into two parts having threads with opposite directions, with each half of the screw having threaded portions of different pitches so that a rotation imparted on the screw brings about a progressive distancing of the four plates R6, maintaining in any case one and the same distance between said plates. In this way, the plates R6 can be carried from the condition where they are set up alongside one another, set up alongside one another, as illustrated in FIG. 10, to the condition where they are spaced apart from one another, as illustrated in FIG. 9, so as to be adaptable to different engine geometries, and in particular, to engines with different distances between centers of the cylinders. The movement of slide R4 is exploited to bring the assembly R from the retracted condition, illustrated in FIG. 9, to an advanced condition, illustrated in FIGS. 10 and 11, where the engagement members R1 are provided for engaging the corresponding parts of the cylinder head.

Figure 11:
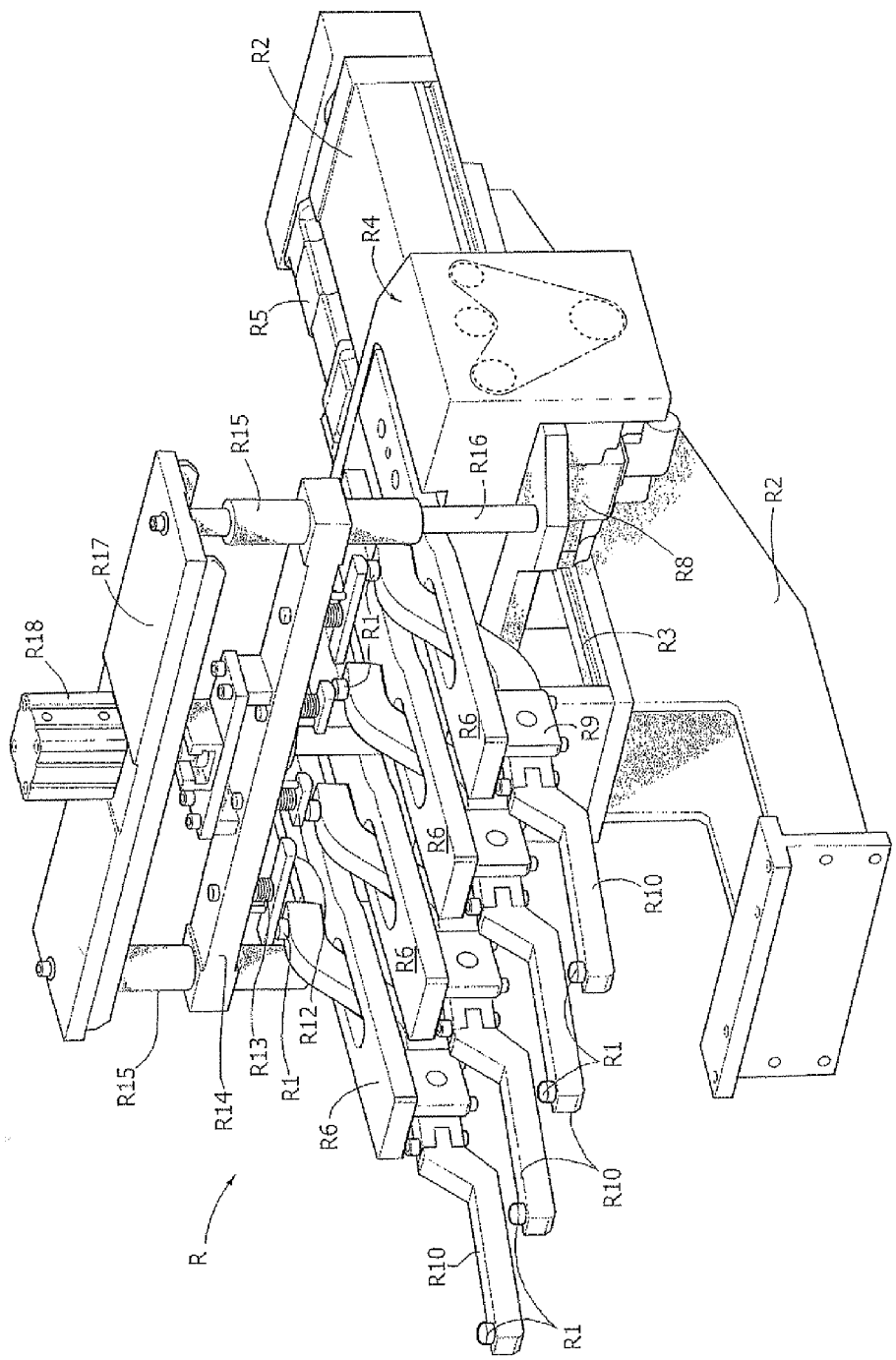
FIG. 11 is a perspective view of the assembly device shown in yet another different operating condition.
Figure 12:
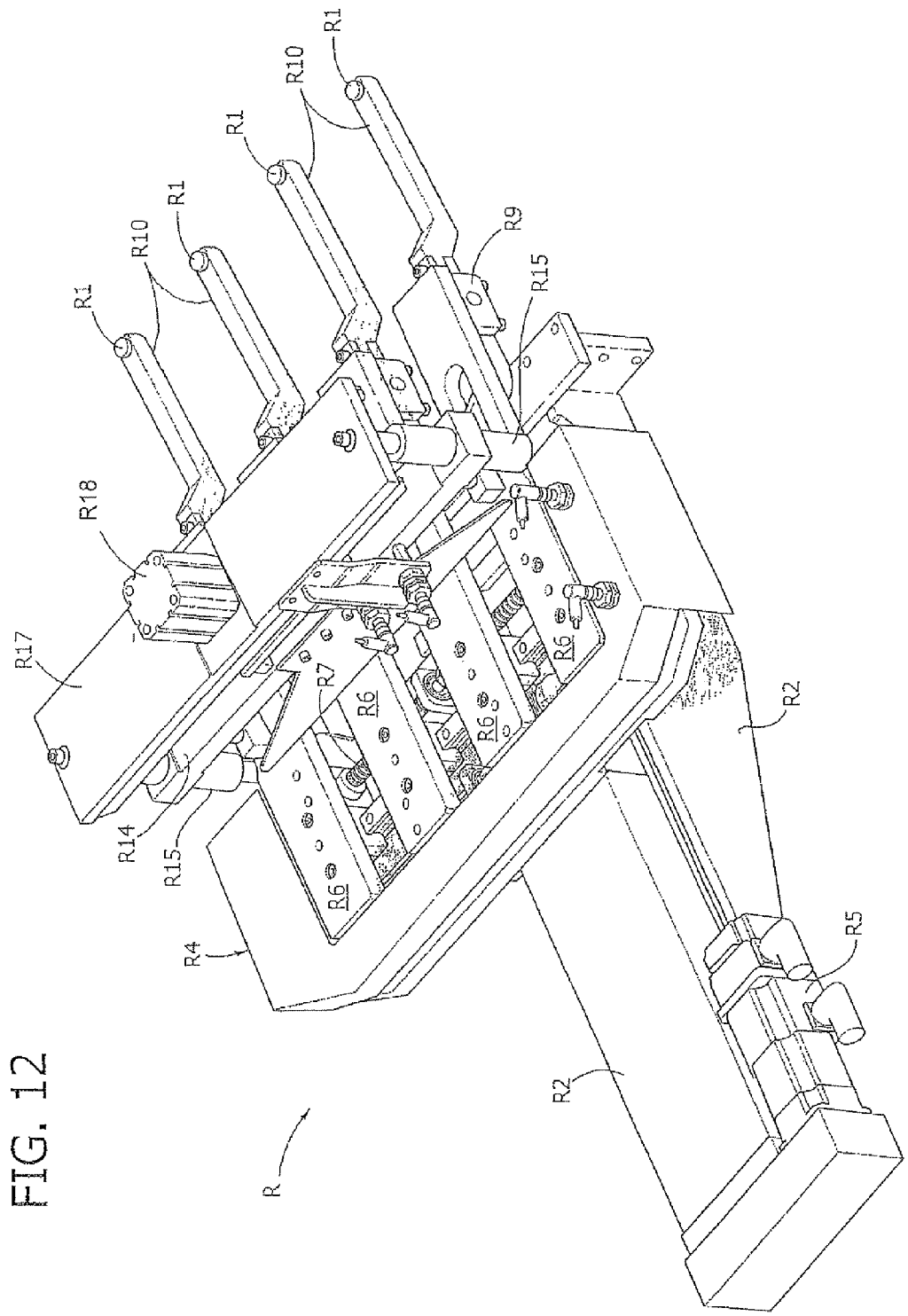
FIG. 12 is a bottom perspective view of the assembly device.

Once again, with reference to FIGS. 9-11, each of the plates R6 is provided, at the bottom, with a support R9, to which an arm R10 is articulated as a rocker. Each arm R10 has one end bearing the aforesaid engagement member R1 and the opposite end bearing a buffer R11 in contact with a pusher element R12. The pusher elements R12 have an elongated configuration to ensure contact with the buffer R11 over the range of different positions of arm R10 in the direction A, which can be selected by activating motor R8. All the pushers R12 can be configured as plates, which are carried by means of springs R13 by a single cross member R14 that is mounted so that it can slide vertically via two vertical cylindrical bushings R15, which are fixed to the ends of the cross member R14, said ends being guided so that they can slide on two cylindrical columns R16 carried by the bridge-like slide R4. The columns R16 are connected, at their top ends, by a cross member R17 bearing a fluid cylinder R18, the stem of which governs a vertical displacement of cross member R14. Starting from the condition illustrated in FIG. 11, a lowering of the cross member R14 brings about a downward thrust, exerted by the element R12 on the buffers R11 at the rear ends of the arms R10 so that the front engagement members R1 are displaced upwards into their operating position of engagement of the respective seats of the cylinder head.

Due to the pre-arrangement of the means that enable adjustment of the relative distance between the engagement members R1, which can be engaged simultaneously on different portions of the work piece positioned in the assembly station, it is possible to adapt the assembly cell to operate on work pieces of different geometry, so that one and the same station of the assembly line can be adapted over time to operating on engines of a different type, or the same basic scheme of assembly cell can be used to provide different stations along the assembly line.

From the foregoing description, it is evident that the assembly cell for automated assembly operations according to the present invention presents marked characteristics of operating flexibility, which enable the cell to be adopted as a standard unit for setting up the various stations of a complete assembly line, as well as being immediately adaptable to operating on components of different geometries, with the advantage that the assembly line remains substantially usable in the case of a change of production.

Of course, without prejudice to the principle of the invention, the details of construction and the embodiments may vary widely with respect to what is described and illustrated herein, purely by way of non-limiting example, without thereby departing from the scope of the present invention.

What is claimed is:

1. A cell for use in the automated assembly of parts of a multi-cylinder internal combustion engine, the cell comprising:
   a fixed supporting structure defining an assembly station;
   a conveying device for feeding a to be assembled engine into the assembly station for the purpose of assembling thereon one or more accessory elements and for sending the engine out of the assembly station once the assembly operations are completed;
   means for referencing in position and supporting the engine in the assembly station;
   manipulator means moveably mounted on the supporting structure for execution of the assembly operations on the engine that is in the assembly station wherein said manipulator means are operable for simultaneous assembly of a plurality of assembly elements associated with various cylinders on said engine and said manipulator means are adjustable for varying the distance between the positions of said elements to adapt to engines having different values of the distance between centers of the engine cylinders; and
   at least two engagement members, each engagement member connected proximate to an end of a rocker arm mounted articulated on a substantially horizontal plate, each engagement member and rocker arm operable to be positioned at different distances apart from one another each adapted to correspond to a respective cylinder of the engine, wherein the at least two engagement members are adapted to simultaneously engage a selected number of assembly elements to be assembled on the engine.

2. The assembly cell according to claim 1 wherein the manipulator means further comprises a plurality of supporting plates for respective gripping members, the supporting plates adapted to be selectively positioned at different distances in a predetermined direction apart from one another.

3. The assembly cell according to claim 2 wherein said manipulator means further comprises a supporting structure including means for supporting a screw in rotation in a direction corresponding to the predetermined direction that the plates may be selectively positioned for supporting the gripping members, said manipulator means is provided with control means for controlling rotation of said screw, each of said plates is rigidly connected to a lead nut engaged by said screw, said screw having portions with threads with different directions and/or pitches so that a rotation of the screw brings about a simultaneous distancing of the plates, keeping at each instant said plates at equal distances apart from one another.

4. The assembly cell according to claim 3, wherein said manipulator means is carried by a vertically mobile slide, which is mounted so that the manipulator means can slide with respect to a further slide, which is horizontally mobile on the fixed structure of the cell in a direction orthogonal to the direction of a conveying line.

5. The cell according to claim 1, wherein the means for referencing in position and supporting the engine in the assembly station comprise a plate having reference elements operable to engage a pallet supporting the engine, said plate adapted to vertically raise the pallet and position the pallet at a distance from the conveying device.

6. The cell according to claim 5, wherein said plate is carried by a slide movably mounted in a direction parallel to a longitudinal direction of a conveying line.

7. The cell according to claim 6, wherein the slide is mounted so that the slide can translate on a selectively oscillating supporting structure oscillatingly mounted about an axis parallel to the longitudinal direction of the conveying line on a structure that is rigidly connected to the fixed supporting structure of the cell.

8. The cell according to claim 7 wherein the selectively oscillating support structure comprises end walls each having ribbings shaped like the arc of a circle, each ribbing slidably supported between two series of freely rotating rollers carried by two fixed end plates.

9. The cell according to claim 8, wherein the angular position of the oscillating structure is controlled by an electric motor and an external-screw/internal-screw transmission, which governs displacement of a lead nut, fixed to a moving element defining a groove for engagement of a roller carried by a lever, fixed to said oscillating support structure.

10. The cell according to claim 8, wherein the movement of the slide is controlled by an electric motor, carried by the oscillating structure and connected to said slide by an external-screw/internal-screw transmission.

11. The cell according to claim 1, wherein the plates are carried by a respective supporting structure having a screw extending in a direction of selective reciprocal respective movement of the plates and which is supported in rotation by said supporting structure, means being provided for imparting a rotation upon said screw, said plates being provided with respective lead nuts in engagement with said screw, and said screw presenting portions with threads having different pitches and/or directions, so that a rotation of the screw brings about the selective reciprocal movement of the plates from one another, keeping, however, at each instant said plates at equal distances apart from one another.

12. The cell according to claim 11 wherein the structure for supporting the plates bridge slide mounted so that the bridge slide can slide in a horizontal direction orthogonal to the direction of the conveying line on a fixed structure, rigidly connected to the fixed supporting structure of the assembly cell.

13. The cell according to claim 12, wherein the movement of the bridge slide is controlled by an electric motor, carried by said fixed structure by an internal-screw/external-screw transmission.

14. The cell according to claim 13, wherein said bridge slide carries a frame, on which a cross member is vertically mobile, said frame being provided with control means for governing a lowering of said cross member in order to push said cross member against rear ends of the rocker arms so as to bring about raising of the engagement means, carried at the front ends of said arms.

15. The assembly cell of claim 1 further comprising
a plurality of automated-assembly cells for assembling in succession different accessory elements on at least one piece forming an automated assembly line for the assembly of internal combustion engines, each assembly cell having manipulator means suited for carrying out assembly operations in the respective assembly cell.

* * * * *